E. D. LOPEZ.
SIGNALING APPARATUS.
APPLICATION FILED OCT. 9, 1912.

1,092,063.

Patented Mar. 31, 1914.

2 SHEETS—SHEET 1.

WITNESSES

INVENTOR
Ernest Daniel Lopez
BY
ATTORNEYS

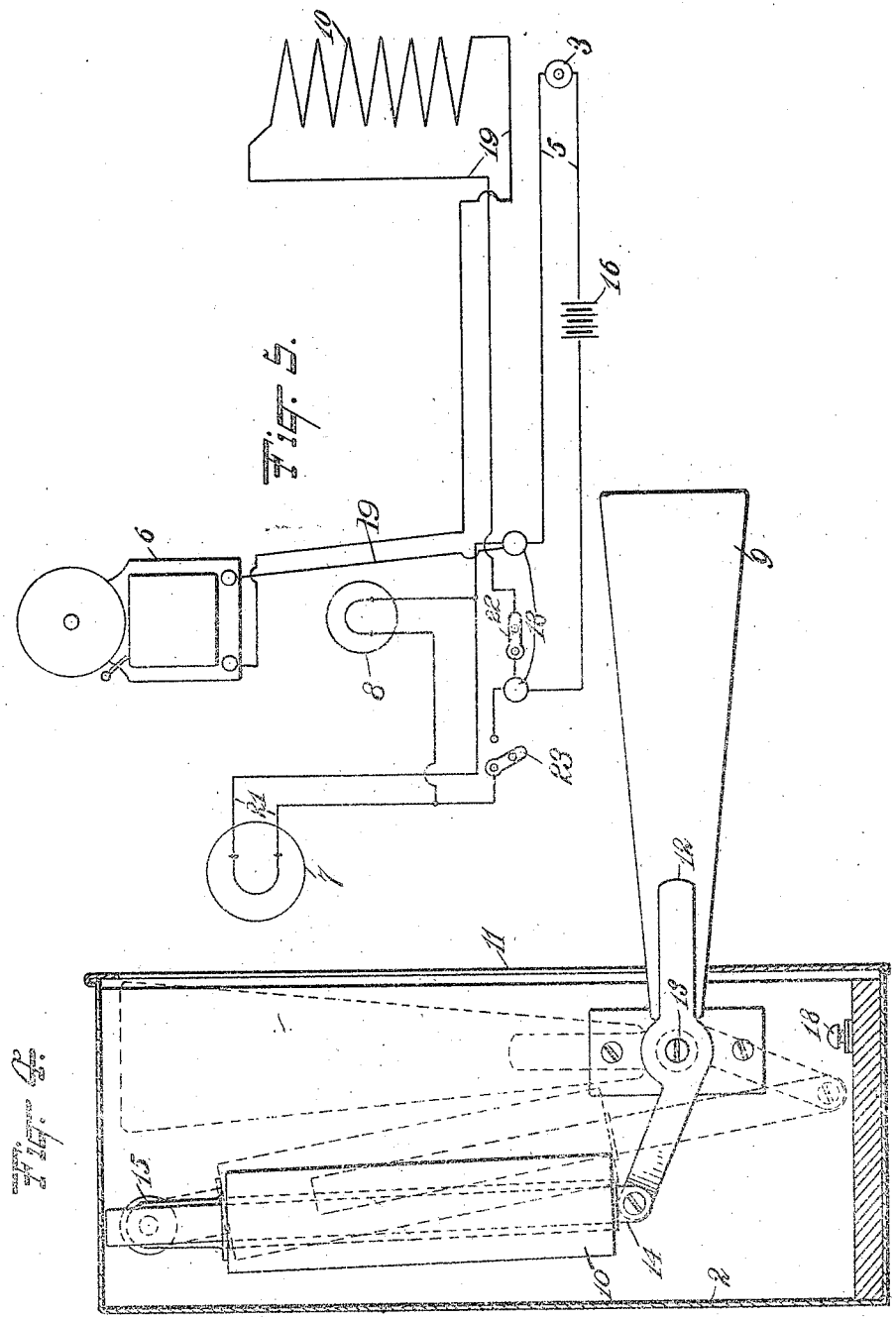

UNITED STATES PATENT OFFICE.

ERNEST DANIEL LOPEZ, OF NEW ORLEANS, LOUISIANA.

SIGNALING APPARATUS.

1,092,063.     Specification of Letters Patent.     Patented Mar. 31, 1914.

Application filed October 9, 1912. Serial No. 724,635.

*To all whom it may concern:*

Be it known that I, ERNEST DANIEL LOPEZ, a citizen of the United States, and a resident of New Orleans, in the parish of Orleans and State of Louisiana, have invented a new and Improved Signaling Apparatus, of which the following is a full, clear, and exact description.

My invention relates to signaling devices designed for use on automobiles and other moving vehicles, and the object thereof is to enable the driver to give notice to the car behind whenever he intends to stop or turn, without necessitating the removal of the driver's hands from the brakes or steering gear when the operation of stopping or turning is to be effected.

Reference is to be had to the accompanying drawings forming a part of this specification, in which the same characters of reference indicate the same parts in all the views.

Figure 1:
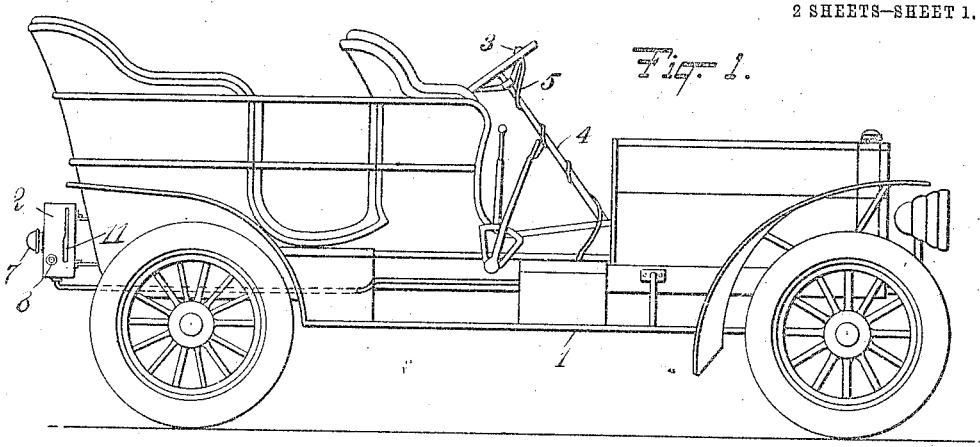
Figures 2, 3:
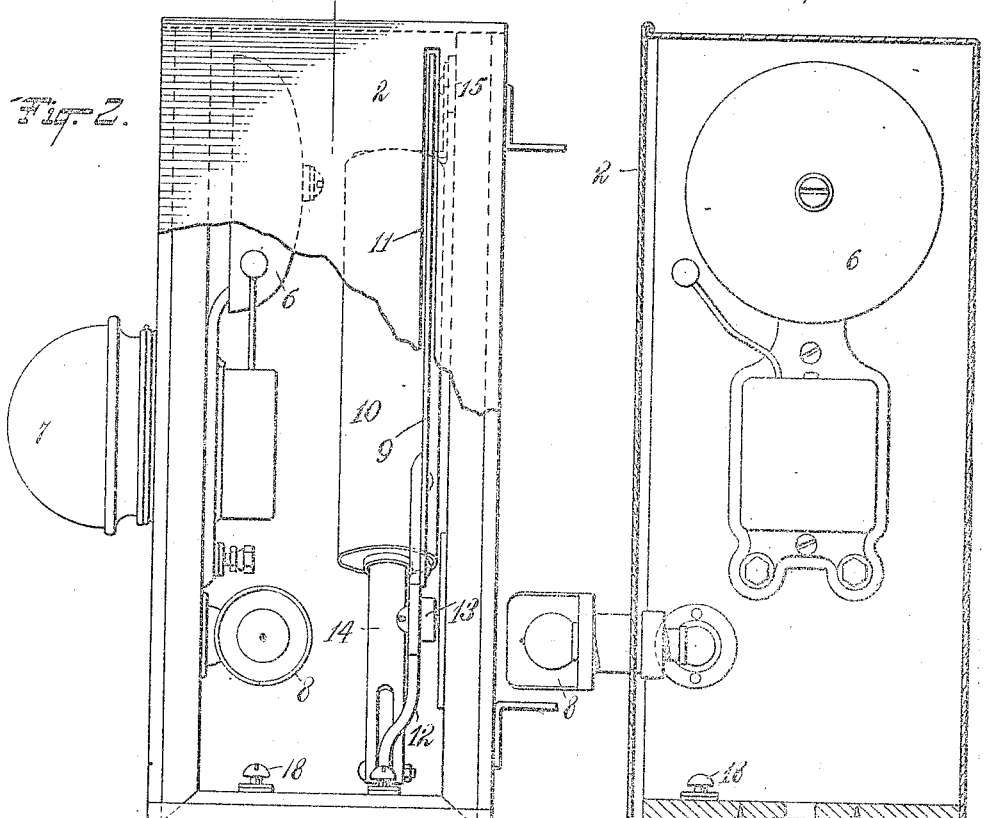

Figure 1 is a view of an automobile showing my signaling apparatus in place; Fig. 2 is a side elevation showing the casing in which the signaling apparatus is mounted, the side of the casing being broken away to show the interior; Fig. 3 is a sectional view on the line 3—3 of Fig. 2; Fig. 4 is a sectional view, similar to that shown in Fig. 3, showing the other half of the interior of the casing; and Fig. 5 is a diagram of circuits by means of which the signals are controlled.

The automobile 1 to which my invention is applied is provided with a casing 2 mounted at the back of the same, and with a push button 3 on the steering post 4, this push button controlling the circuit 5 by means of which the signaling devices in the casing 2 are operated. These signaling devices consist of an electric bell 6 and a pair of lights 7 and 8, together with a semaphore 9 mounted to be movable into position to project out of the casing 2 and to be withdrawn into the casing when the signaling apparatus is not needed. The lamp 7 projects from the rear of the casing, and the lamp 8 from the side thereof, and the semaphore 9 is actuated by a solenoid 10. Normally, the weight of the plunger of this solenoid will be sufficient to retain the semaphore in the casing. Under such circumstances it will occupy the position shown in broken lines in Fig. 4. When the circuit is closed, however, and the plunger of the solenoid attracted, the semaphore 9 will be moved into the full-line position shown in Fig. 4, where it can be seen by the driver of a car following the automobile 1. This semaphore 9 is secured at its inner end to a lever 12 pivoted at 13 inside the casing; and the casing is provided with a slot 11 through which the semaphore 9 is moved edgewise when operated. The inner end of the lever 12 is pivotally connected to a plunger 14 which projects into the solenoid 10. This solenoid is inclosed in a suitable casing, and the casing is provided with an arm at its top pivotally connected at 15 to the side of the casing 2, so as to permit the solenoid to swing when the plunger 14 and the lever 12 are moved.

The manner in which the wiring is arranged is shown in Fig. 5. The conductors 5 connect the circuit-closing push button 3 to a battery 16, and pass through an aperture 17 in the bottom of the casing 2 to binding posts 18. From the posts 18 lead conductors 19 to the solenoid 10, and to the bell 6 in series, and the lights 7 and 8 are connected to the posts 18, so as to be in parallel with each other and the bell and coil, by wires 21. A switch 22 is provided to cut out the bell and the coil, and a switch 23 to cut out the two lights 7 and 8. The coil and bell will be in series and will be connected in circuit with the battery 16 in the daytime, and all the signals will preferably be connected in circuit in the dark. When the driver of the automobile wishes to turn or stop without running the risk of a car behind colliding with him, he first presses the button 3 before turning the steering gear or applying the brakes. This closes the circuits, making the bell ring, illuminating the lamps 7 and 8, and energizing the solenoid 10 to attract the plunger 14 and swing the semaphore 9 downward through the slot 11 into projecting position. This operation gives warning to the car behind and enables the driver thereof to slow down. After making the turn the release of the button 3 breaks the circuit and deënergizes the bell, the lamps and the solenoid, whereby the weight of the plunger 14 will revolve the semaphore 9 back into the casing. As stated, the solenoid can swing around the pivot 15 the required extent to effect the complete withdrawal of the semaphore.

It will be observed from the above description that the signals can be operated without the driver having to release the steering gear or the braking apparatus. The button 3 can be operated simply by the pressure of the thumb, and it is not necessary for the chauffeur to let go of the steering wheel when this is effected. The batteries used for the furnishing of ignition current to the engine can be employed to operate the signals. The bell 6 will attract attention by its sound whenever the button 3 is pushed, and the position of the semaphore 9 will serve to notify the driver of the car behind of the intentions of the driver of the car 1. The provision of the lights 7 and 8 will make the semaphore visible either by day or by night.

As stated above, all the signals will be in circuit in the dark, and in the daytime in order to save battery current the switch 23 may be moved to open position to cut out the two lights 7 and 8. The switches 22 and 23 will be of any well-known "push-button" type, and will be mounted upon the casing 2 in any convenient operative position.

I wish to have it understood that the above description is illustrative only, disclosing but one embodiment of my invention, and I do not care to be limited to the exact details thereof, except in so far as indicated in the accompanying claim.

Having thus described my invention I claim as new and desire to secure by Letters Patent:

In an improvement of the kind described, the combination of a casing having a slot, a semaphore pivotally mounted in the casing to be moved outward through the same, a plunger pivotally connected to the inner end of said semaphore, and a pivotally-mounted solenoid receiving said plunger, the weight of said plunger serving to retain the semaphore in the casing, and also serving, when attracted by the solenoid, to move the semaphore out of the casing.

In testimony whereof I have signed my name to this specification in the presence of two subscribing witnesses.

ERNEST DANIEL LOPEZ.

Witnesses:
 M. A. VERLANDER,
 P. L. FOURCHY.